(12) United States Patent
Yoshihara et al.

(10) Patent No.: US 6,888,610 B2
(45) Date of Patent: May 3, 2005

(54) LIQUID CRYSTAL DISPLAY DEVICE HAVING SPONTANEOUS POLARIZATION

(75) Inventors: Toshiaki Yoshihara, Kawasaki (JP); Hironori Shiroto, Kawasaki (JP); Tetsuya Makino, Kawasaki (JP); Keiichi Betsui, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 22 days.

(21) Appl. No.: 10/345,189

(22) Filed: Jan. 16, 2003

(65) Prior Publication Data

US 2003/0156243 A1 Aug. 21, 2003

(30) Foreign Application Priority Data

Feb. 19, 2002 (JP) ........................................ 2002-041722

(51) Int. Cl.[7] .............................................. G02F 1/141
(52) U.S. Cl. ...................................... 349/172; 349/171
(58) Field of Search ................................ 349/171–174

(56) References Cited

U.S. PATENT DOCUMENTS

| | | | | |
|---|---|---|---|---|
| 5,495,351 A | * | 2/1996 | Shingaki et al. | ............. 349/74 |
| 5,617,229 A | * | 4/1997 | Yamamoto et al. | ........... 349/42 |
| 6,323,850 B1 | * | 11/2001 | Katakura et al. | ........... 345/204 |
| 6,496,170 B1 | * | 12/2002 | Yoshida et al. | ............... 345/87 |
| 6,600,544 B2 | * | 7/2003 | Yoshihara et al. | .......... 349/172 |

* cited by examiner

Primary Examiner—Andrew Schechter
(74) Attorney, Agent, or Firm—Staas & Halsey

(57) ABSTRACT

A liquid crystal layer is formed by filling a space between alignment films provided on both glass substrates with a ferroelectric liquid crystal material having a spontaneous polarization. This ferroelectric liquid crystal exhibits a monostable state in which the average molecular axis of the liquid crystal molecular director is present in substantially one direction in the absence of an applied voltage. When a voltage of a first polarity is applied, the average molecular axis tilts from the monostable position to one side at an angle corresponding to the magnitude of the applied voltage, while, when a voltage of a second polarity having the opposite characteristic to the first polarity is applied, the average molecular axis tilts from the monostable position to a side opposite to the application of the voltage of the first polarity. A maximum tilt angle in the application of the voltage of the first polarity is not less than 35°, more preferably not less than 450°. With the use of a liquid crystal material having a large spontaneous polarization, a high-speed response is realized even when the applied voltage to the liquid crystal material is low.

9 Claims, 15 Drawing Sheets

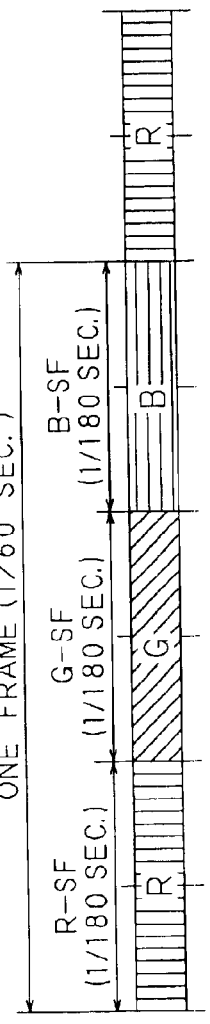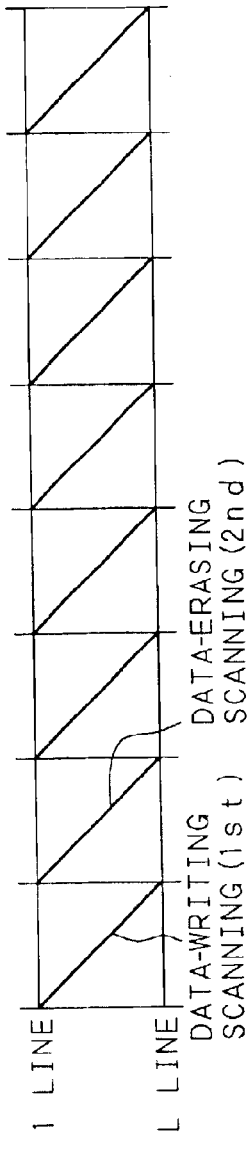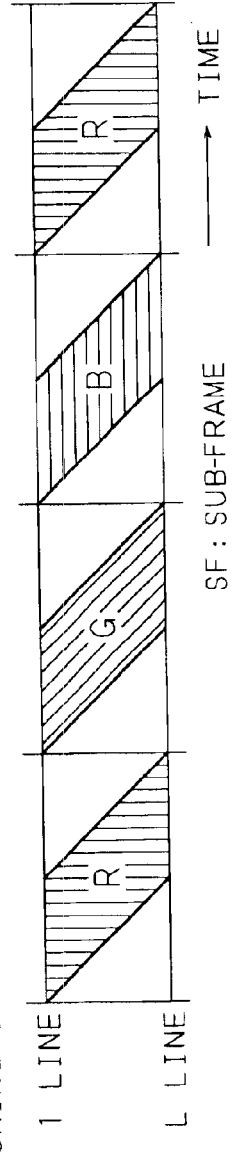
FIG. 10A EMITTING OF BACK-LIGHT
FIG. 10B SCANNING OF PANEL
FIG. 10C COLORING OF PANEL

LIQUID CRYSTAL DISPLAY DEVICE HAVING SPONTANEOUS POLARIZATION

BACKGROUND OF THE INVENTION

The present invention relates to a liquid crystal display device for displaying an image by using a liquid crystal material having a spontaneous polarization and on/off driving switching elements.

Along with the recent development of so-called information-oriented society, electronic apparatuses, such as personal computers and PDA (Personal Digital Assistants), have been widely used. Further, with the spread of such electronic apparatuses, portable apparatuses that can be used in offices as well as outdoors have been used, and there are demands for reduction in the size and weight of these apparatuses. Liquid crystal display devices have been widely used as one of the means to satisfy such demands. Liquid crystal display devices not only achieve reduction in their size and weight, but also include an indispensable technique in an attempt to achieve low power consumption in portable electronic apparatuses that are driven by batteries.

The liquid crystal display devices are mainly classified into the reflection type and the transmission type. In the reflection type liquid crystal display devices, light rays incident from the front face of a liquid crystal panel are reflected by the rear face of the liquid crystal panel, and an image is visualized by the reflected light; whereas in the transmission type liquid crystal display devices, the image is visualized by the transmitted light from a light source (back-light) placed on the rear face of the liquid crystal panel. Since the reflection type liquid crystal display devices have poor visibility because the reflected light amount varies depending on environmental conditions, transmission type liquid crystal display devices are generally used as display devices of, particularly, personal computers that display multi-color or full-color images.

Besides, the current color liquid crystal display devices are generally classified into the STN (Super Twisted Nematic) type and the TFT-TN (Thin Film Transistor-Twisted Nematic) type, based on the liquid crystal materials to be used. The STN type liquid crystal display devices can be produced at comparatively low costs, but they are not suitable for the display of a moving image because they are susceptible to crosstalk and comparatively slow in the speed of response. In contrast, the TFT-TN type liquid crystal display devices have better display quality than the STN type, but they require a back-light with high intensity because the light transmittance of the liquid crystal panel is only 4% or so at present. For this reason, in the TFT-TN type liquid crystal display devices, a lot of power is consumed by the back-light, and there would be a problem when used with a portable battery power source. Moreover, since a color display is realized using a color filter, a single pixel needs to be composed of three sub-pixels, and there are problems that it is difficult to provide a high-resolution display and the purity of the displayed colors is not sufficient.

In order to solve such problems, the present inventor et al. developed a field-sequential type liquid crystal display device. Since this field-sequential type liquid crystal display device does not require sub-pixels, it is possible to realize a higher-resolution display easily compared to color-filter type liquid crystal display devices. Moreover, since this device can use the color of light emitted by the light source as it is for display, without using a color filter, the displayed color has excellent purity. Furthermore, since the light unitization efficiency is high, this device has the advantage of low power consumption. However, in order to realize the field-sequential type liquid crystal display device, a high-speed response of liquid crystal is essential. Therefore, in order to realize a field-sequential liquid crystal display device having a significant advantage as mentioned above or achieve a high-speed response of a color-filter type liquid crystal display device, the present inventor et al. are conducting research and development on driving of liquid crystals such as a ferroelectric liquid crystal having a spontaneous polarization, which may achieve a 100 to 1000 times faster response compared to conventional driving, with a switching element such as a TFT (Thin Film Transistor).

In the ferroelectric liquid crystal, as shown in FIG. 1, the long-axis direction of the liquid crystal molecule changes by only a tilt angle $\theta$ with the application of a voltage. A liquid crystal panel sandwiching the ferroelectric liquid crystal therein is sandwiched by two polarizers whose polarization axes are orthogonal to each other, and the intensity of the transmitted light is changed using the birefringence caused by the change in the long-axis direction of the liquid crystal molecule. When the ferroelectric liquid crystal is driven by a switching element such as a TFT, the spontaneous polarization is switched according to the amount of charge injected (stored) in a pixel through the switching element, and the intensity of transmitted light changes.

A conventional ferroelectric liquid crystal has a memory characteristic. When the conventional ferroelectric liquid crystal is driven by a switching element such as a TFT, it utilizes the memory characteristic in a dark state (applied voltage: substantially 0 V), and obtains a light transmittance according to the applied voltage in a bright state. However, in the dark state utilizing the memory characteristic, a failure in writing, etc. deteriorates the memory characteristic and lowers the contrast ratio.

In order to solve this problem, TFT driving using a monostable ferroelectric liquid crystal has been tested. By causing the monostable state to be a dark state by using the monostable ferroelectric liquid crystal, an increase in the brightness in the dark state due to deterioration of the memory characteristic, which was observed in a bistable ferroelectric liquid crystal, is improved, but there is a problem of low light transmittance.

By the way, in a conventional liquid crystal display in which a liquid crystal such as a ferroelectric liquid crystal having a spontaneous polarization is driven by a switching element such as a TFT, if the size of spontaneous polarization per unit area is Ps and the electrode area of each pixel is A, $2Ps \cdot A$ (the total charge amount of a switching current caused by complete reversal of the spontaneous polarization) is limited not to exceed a charge amount Q injected into each pixel through the switching element. In other words, the liquid crystal material, pixel electrodes, TFTs, etc. are designed so as to satisfy the condition of $2Ps \cdot A \leq Q$.

However, with the application of a voltage of not higher than 7 V, since the magnitude Ps of spontaneous polarization satisfying the above-mentioned condition becomes as small as or less than $8 \text{ nC/cm}^2$, Ps can not be increased much, and consequently the response is slow. Therefore, in the aspect of the response, particularly the response at low temperature, there is demand for an increase in the magnitude of spontaneous polarization. Moreover, there is a problem that the degree of freedom in selecting a liquid crystal material is low. When a liquid crystal material having a large spontaneous polarization is used in view of the response and selectable liquid crystal materials, it is necessary to increase Q, there is a problem of an increase in the applied voltage. In addition, as shown in FIG. 2, near the end of switching of the spontaneous polarization, since the change of the optical axis caused by switching of the liquid crystal is small, the ratio of a change in the intensity of the transmitted light due to an increase in the applied voltage is smaller, and a higher applied voltage is necessary to obtain a maximum transmitted light intensity.

BRIEF SUMMARY OF THE INVENTION

The present invention has been made with the aim of solving the above problems, and it is an object of the present invention to provide a liquid crystal display device that drives a liquid crystal material having a spontaneous polarization, particularly a monostable ferroelectric liquid crystal material, by a switching element such as a TFT, and is capable of realizing a high light transmittance, using a liquid crystal material having a large spontaneous polarization, and limiting an applied voltage to the liquid crystal material to a low level.

A liquid crystal display device according to the first aspect, comprises: a liquid crystal material having a spontaneous polarization between two substrates facing each other; electrodes for applying a voltage to the liquid crystal material; and switching elements connected to the electrodes, wherein the liquid crystal material exhibits a monostable state in which an average molecular axis of a liquid crystal molecular director is present in substantially one direction in absence of an applied voltage, and, when a voltage of a first polarity such as + is applied, the average molecular axis tilts from a monostable position to one side at an angle corresponding to a magnitude of the applied voltage, while, when a voltage of a second polarity such as − having an opposite characteristic to the first polarity is applied, the average molecular axis maintains the monostable position or tilts from the monostable position to a side opposite to the application of the voltage of the first polarity, and wherein, when the tilt angle in the application of the voltage of the first polarity is larger than the tilt angle in the application of the voltage of the second polarity, a maximum tilt angle in the application of the voltage of the first polarity is not less than 35°.

In the first aspect, as shown in FIGS. 3A, 3B and 3C, the liquid crystal material having a spontaneous polarization exhibits a monostable state in which an average molecular axis of a liquid crystal molecular director is present in substantially one direction (i.e., the long-axis direction of liquid crystal molecule is in substantially one direction) in the absence of an applied voltage (FIG. 3A). When a voltage of the first polarity is applied, the average molecular axis tilts from the monostable position to one side at an angle corresponding to the magnitude of the applied voltage (FIG. 3B), while, when a voltage of the second polarity having the opposite characteristic to the first polarity is applied, the average molecular axis maintains the monostable position or tilts from the monostable position to a side opposite to the application of the voltage of the first polarity (FIG. 3C). When the tilt angle in the application of the voltage of the first polarity is larger than the tilt angle in the application of the voltage of the second polarity, a maximum tilt angle in the application of the voltage of the first polarity is not less than 35°. A light transmittance T depends on a tilt angle θ in the application of the voltage of the first polarity, and satisfies the following condition (1). Here, k is a proportional constant.

$$T = k \cdot \sin^2 2\theta \quad (1)$$

Accordingly, by making the tilt angle not to be less than 35°, $\sin^2 70° \approx 0.89$, and therefore a high light transmittance of around 90% that is an ideal light transmittance is obtained.

Thus, in the driving of a liquid crystal material having a spontaneous polarization, particularly a ferroelectric liquid crystal material, by a switching element such as a TFT, it is possible to achieve a high light transmittance, use a liquid crystal material having a large spontaneous polarization, and realize low-voltage driving of the liquid crystal material.

A liquid crystal display device according to the second aspect is based on the first aspect, wherein the maximum tilt angle in the application of the voltage of the first polarity is not less than 45°.

In the second aspect, the maximum tilt angle in the application of the voltage of the first polarity is preferably not less than 45°. By arranging the maximum tilt angle in the application of the voltage of the first polarity not to be less than 45°, a maximum value is present in the applied voltage-transmitted light intensity characteristic as shown in FIG. 4 when the tilt angle θ=45°. It is therefore possible to achieve a high light transmittance.

A liquid crystal display device according to the third aspect is based on the first aspect, wherein a maximum tilt angle in the application of the voltage of the second polarity is not more than 10°.

In the third aspect, a maximum tilt angle in the application of the voltage of the second polarity is made not more than 10°. Accordingly, the light transmittance when the voltage of the second polarity is applied is smaller, and a stable display is performed.

A liquid crystal display device according to the fourth aspect is based on the first aspect, wherein the maximum tilt angle in the application of the voltage of the first polarity during actual driving is not more than 45°.

In the fourth aspect, the maximum tilt angle in the application of the voltage of the first polarity during actual driving is made not more than 45°, and display is performed in a region where the intensity of transmitted light is between substantially zero and substantially a maximum. Within a range up to the tilt angle of 45°, the light transmittance does not decrease according to an increase in the applied voltage (increase in the tilt angle), and the liquid crystal material is driven in a stable manner.

A liquid crystal display device according to the fifth aspect is based on any one of the first through fourth aspects, wherein a relation 2Ps·A>Q is satisfied, where Q is a maximum charge amount stored in each pixel by switching of the switching element, A is the area of the electrodes, and Ps is the magnitude of the spontaneous polarization per unit area.

In the fifth aspect, the relation 2Ps·A>Q is satisfied. Conventionally, the liquid crystal material or the like is designed so that the magnitude Ps of the spontaneous polarization satisfies the relation 2Ps·A≦Q, and the liquid crystal material is driven so that the spontaneous polarization is completely reversed by the application of a voltage. The present inventor et al. examined the behavior of a liquid crystal material having a spontaneous polarization, particularly a ferroelectric liquid crystal, by TFT driving in detail, and consequently found that the ferroelectric liquid crystal can be driven by the TFT even under a condition opposite to the above-mentioned condition, where the maximum charge amount stored in each pixel by switching of the switching element is smaller than the total charge amount of a switching current resulting from a complete reversal of the spontaneous polarization of the liquid crystal material, i.e., the condition of 2Ps·A>Q.

Therefore, in the fifth aspect, the liquid crystal material or the like is designed to satisfy the relation 2Ps·A>Q, and the spontaneous polarization is increased so as to improve the response characteristic. Moreover, a reduction in the applied voltage is achieved by performing display in a range where the spontaneous polarization is not completely reversed so as not to use a portion near the end of switching of the spontaneous polarization where the ratio of a change in the intensity of the transmitted light due to an increase in the applied voltage is smaller, for display. In this case, in the liquid crystal display device of the present invention in which 2Ps·A>Q is satisfied and the maximum tilt angle of the liquid crystal material is made not less than 45°, since the portion near the end of switching of the spontaneous polarization where the ratio of a change in the intensity of the transmitted light due to an increase in the applied voltage is smaller is not used for display, it is possible to reduce the applied voltage.

A liquid crystal display device according to the sixth aspect is based on any one of the first through fifth aspects, wherein a maximum charge amount stored in each pixel by switching of the switching element is smaller than a total charge amount of a switching current per pixel resulting from a complete reversal of the spontaneous polarization of the liquid crystal material.

In the sixth aspect, since the maximum charge amount stored in each pixel by switching is made smaller than the total charge amount of a switching current per pixel resulting from a complete reversal of the spontaneous polarization of the liquid crystal material, it is possible to reduce the applied voltage.

A liquid crystal display device according to the seventh aspect is based on any one of the first through sixth aspects, and further comprises an additional storage capacity on the liquid crystal material driving electrode side of the switching element.

In the seventh aspect, since an additional storage capacity is provided on the liquid crystal material driving electrode side of the switching element, the maximum charge amount Q can be increased, and thereby making is possible to increase the magnitude Ps of the spontaneous polarization per unit area, reduce the applied voltage, and use a liquid crystal material having a large spontaneous polarization.

A liquid crystal display device according to the eighth aspect is based on any one of the first through seventh aspects, wherein the liquid crystal material is driven within an applied voltage range of 0 to ±V, where V is an applied voltage to the liquid crystal material at which the light transmittance of the liquid crystal material becomes a maximum.

In the eighth aspect, the liquid crystal material is driven within an applied voltage range of 0 to ±V (V is an applied voltage at which the light transmittance becomes a maximum), and stable driving of the liquid crystal material is performed.

A liquid crystal display device according to the ninth aspect is based on the eighth aspect, wherein, if a charge amount injected in each pixel when the applied voltage is +V or −V is denoted by q, a charge amount of a current flowed by a response of the liquid crystal material due to the applied voltage of +V or −V is not more than q.

In the ninth aspect, the material for the liquid crystal material is designed so that the charge amount of a current flowed by a response of the liquid crystal material when the applied voltage is +V or −V is not more than q, (q: the charge amount stored in each pixel when the applied voltage is ±V), i.e., a maximum change in the tilt angle of the liquid crystal material when the voltage of the first polarity is applied is substantially 45° and the charge amount of the current flowed by switching of the liquid crystal material is not more than q, where q is the charge amount stored in the pixel when the applied voltage is V, and consequently stable driving of the liquid crystal material is performed.

A liquid crystal display device according to the tenth aspect is based on any one of the first through ninth aspects, and further comprises a back-light having a light source for emitting light of three primary colors, wherein a color image is displayed by time-division switching of colors of light emitted by the light source in synchronism with on-off driving of the switching elements.

In the tenth aspect, a back-light having a light source for emitting light of three primary colors is provided, and a color image can be displayed by a field-sequential method by time-division switching of colors of light emitted by the light source in synchronism with on-off driving of the switching elements.

The above and further objects and features of the invention will more fully be apparent from the following detailed description with accompanying drawings.

BRIEF DESCRIPTION OF THE SEVERAL VIEWS OF THE DRAWINGS

FIGS. 10A, 10B and 10C are time charts showing display control in the liquid crystal display device;

DETAILED DESCRIPTION OF THE INVENTION

The following description will specifically explain the present invention with reference to the drawings illustrating an embodiment thereof. It should be noted that the present invention is not limited to the following embodiment.

Figure 1:
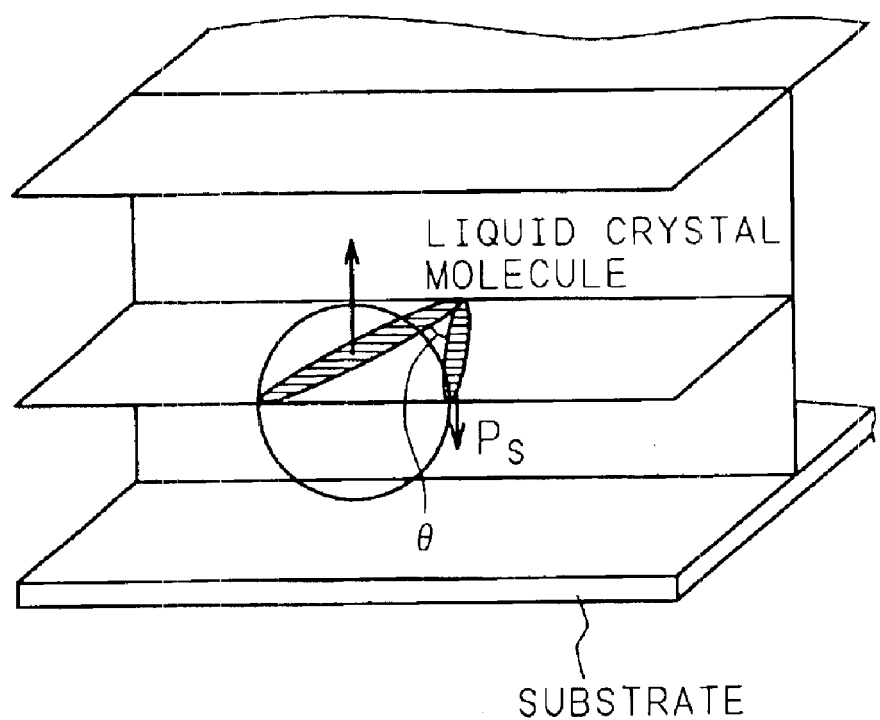
FIG. 1 is an illustration showing an alignment state of a liquid crystal molecule in a ferroelectric liquid crystal panel.
Figure 2:
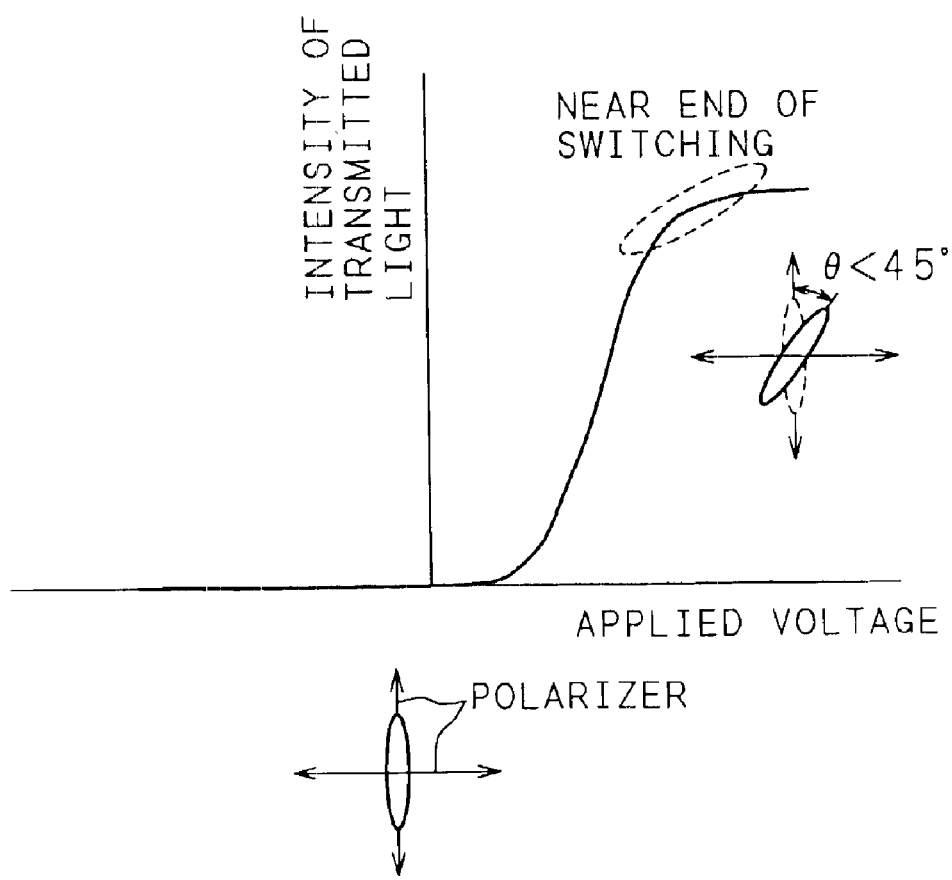
FIG. 2 is a graph showing the applied voltage-transmitted light intensity characteristic of a conventional liquid crystal display device.
Figure 3A:
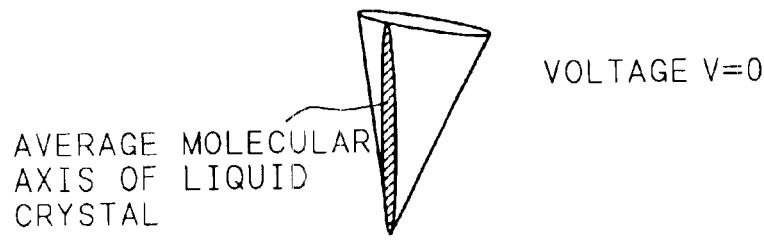
FIGS. 3A, 3B and 3C are illustrations for explaining a tilt of a monostable ferroelectric liquid crystal.
Figure 3B:
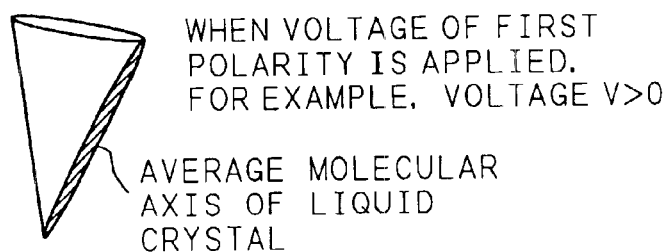
Figure 3C:
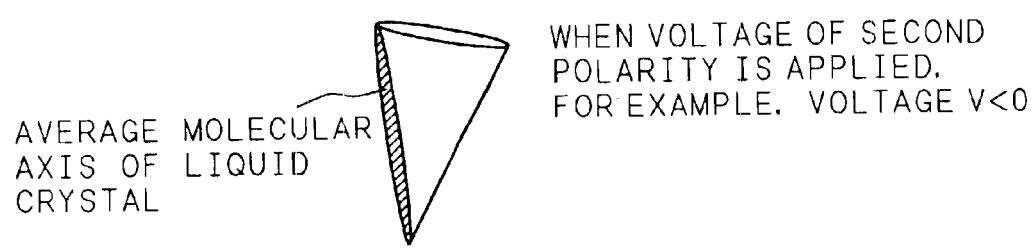
Figure 4:
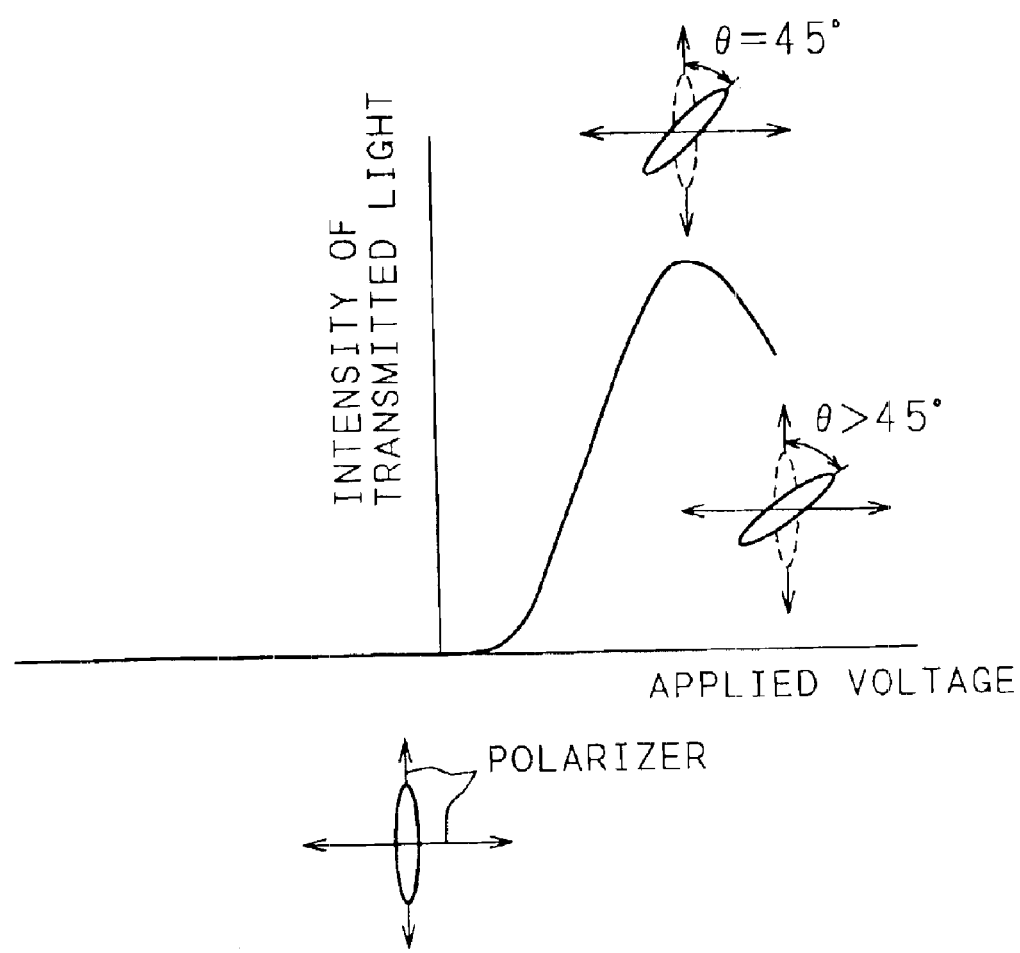
FIG. 4 is a graph showing the applied voltage-transmitted light intensity characteristic of a liquid crystal display device of the present invention.
Figure 5:
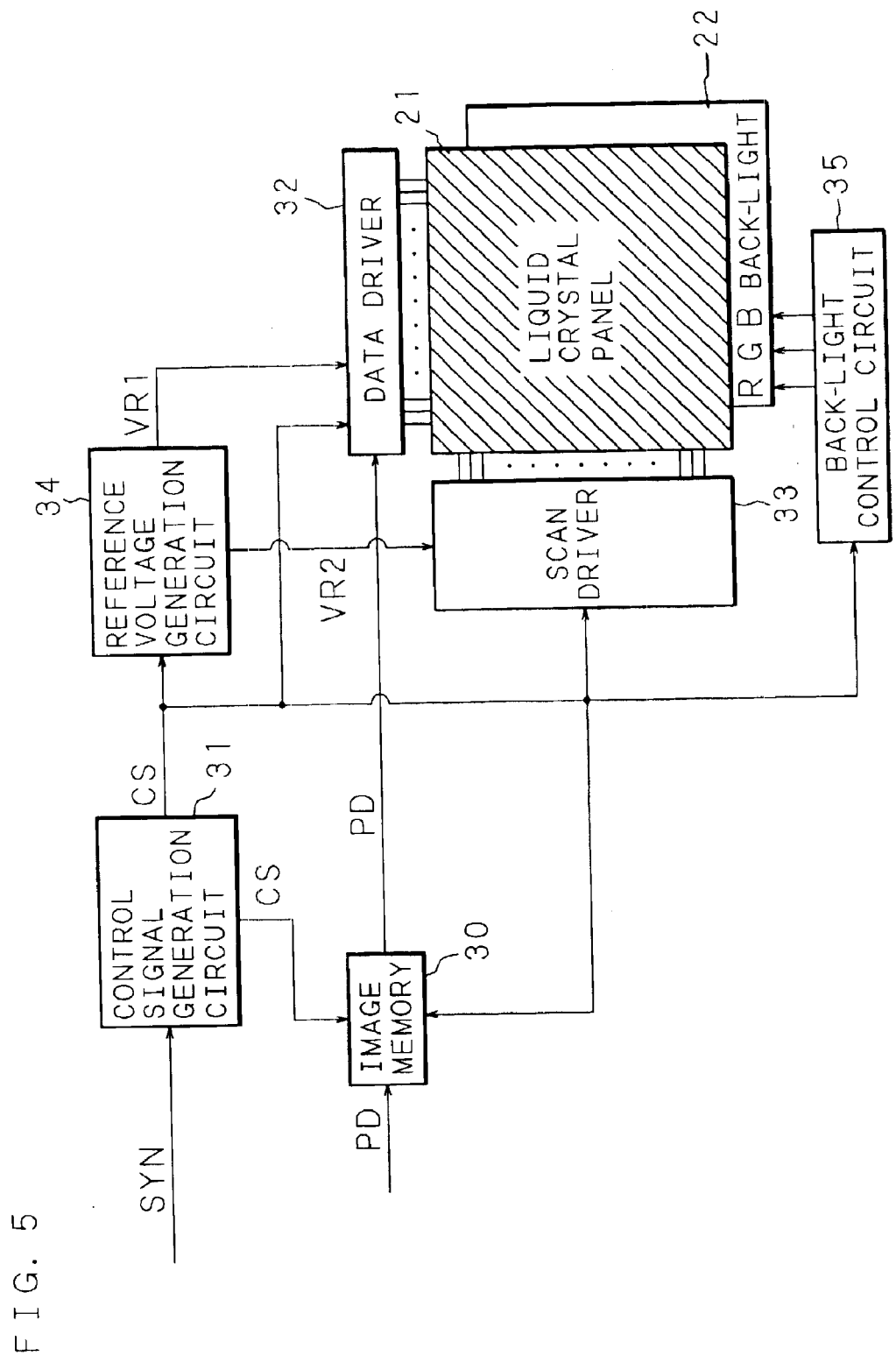
FIG. 5 is a block diagram showing the circuit structure of the liquid crystal display device.
Figure 6:
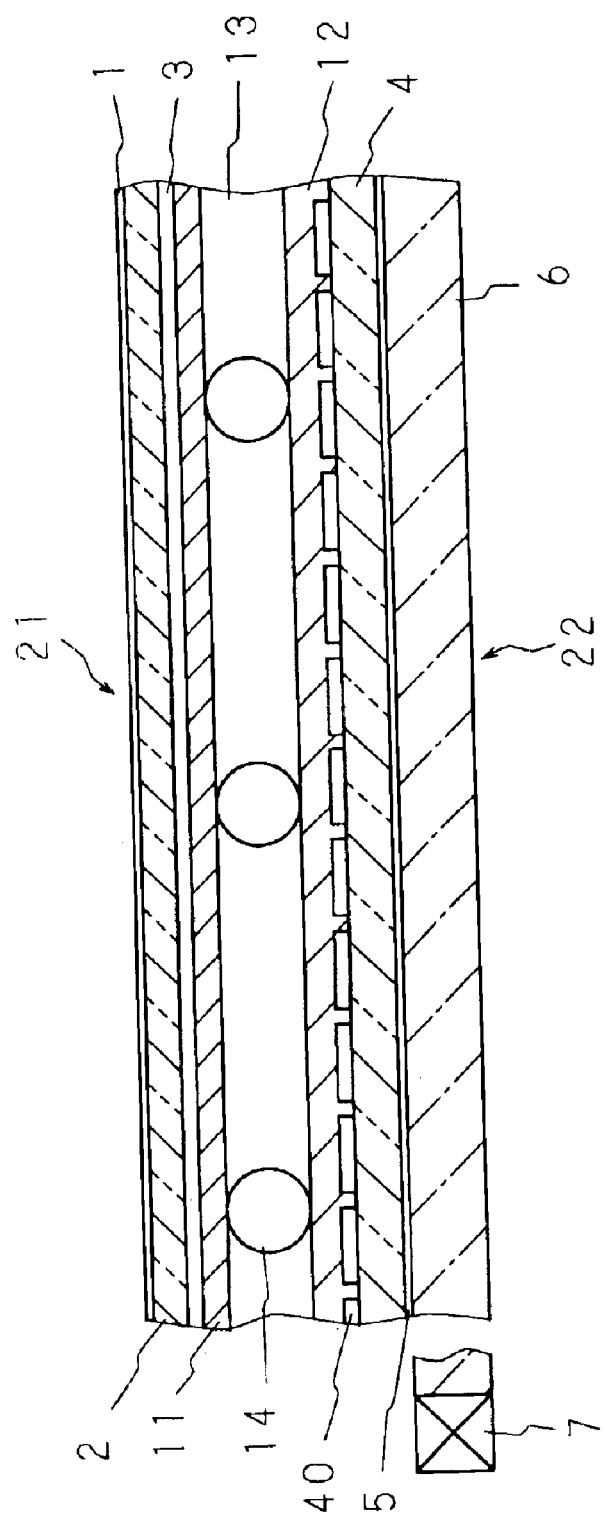
FIG. 6 is a schematic cross sectional view of a liquid crystal panel and a back-light.
Figure 7:
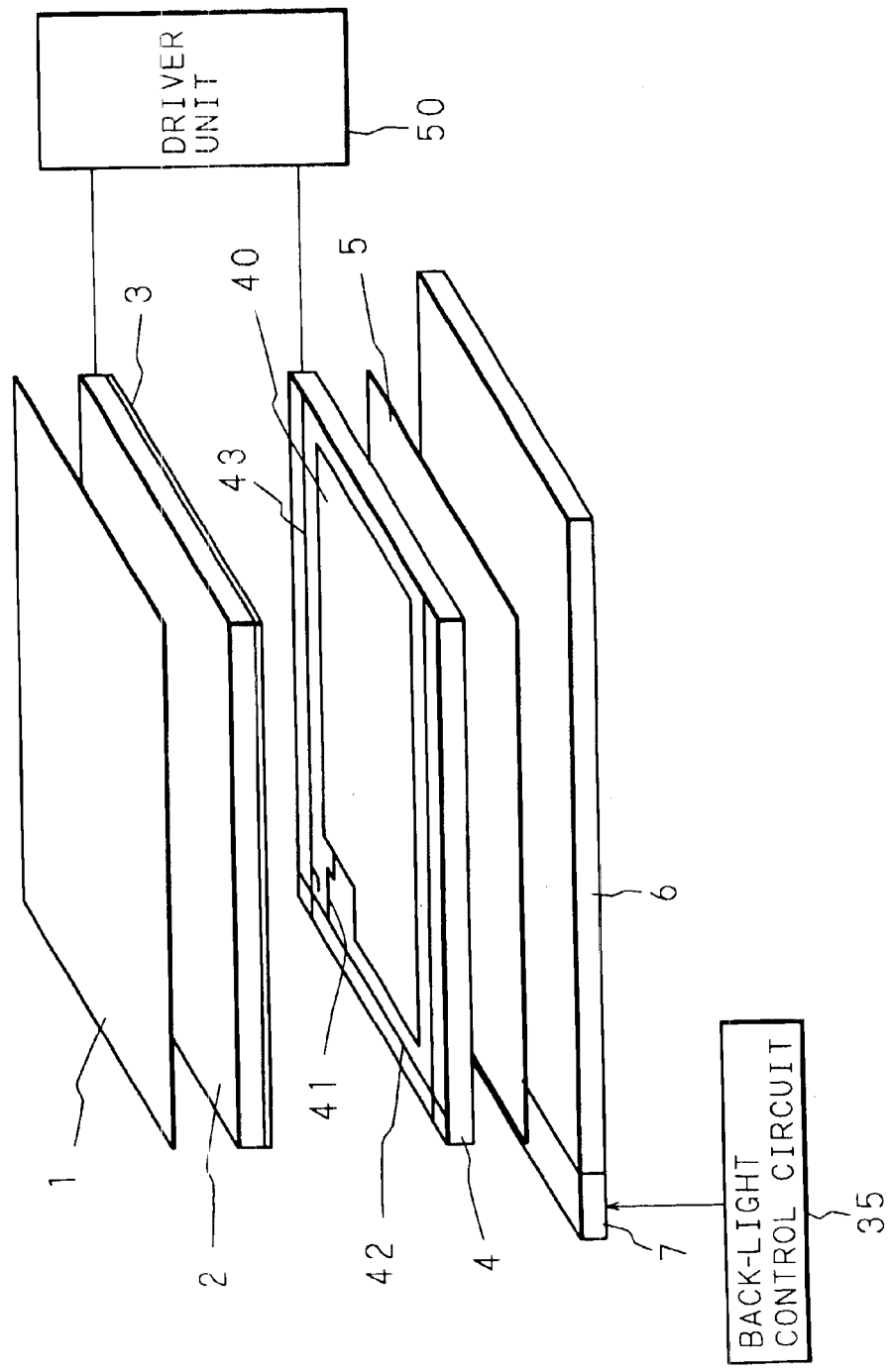
FIG. 7 is an illustration showing an example of the overall structure of the liquid crystal display device.
Figure 8:
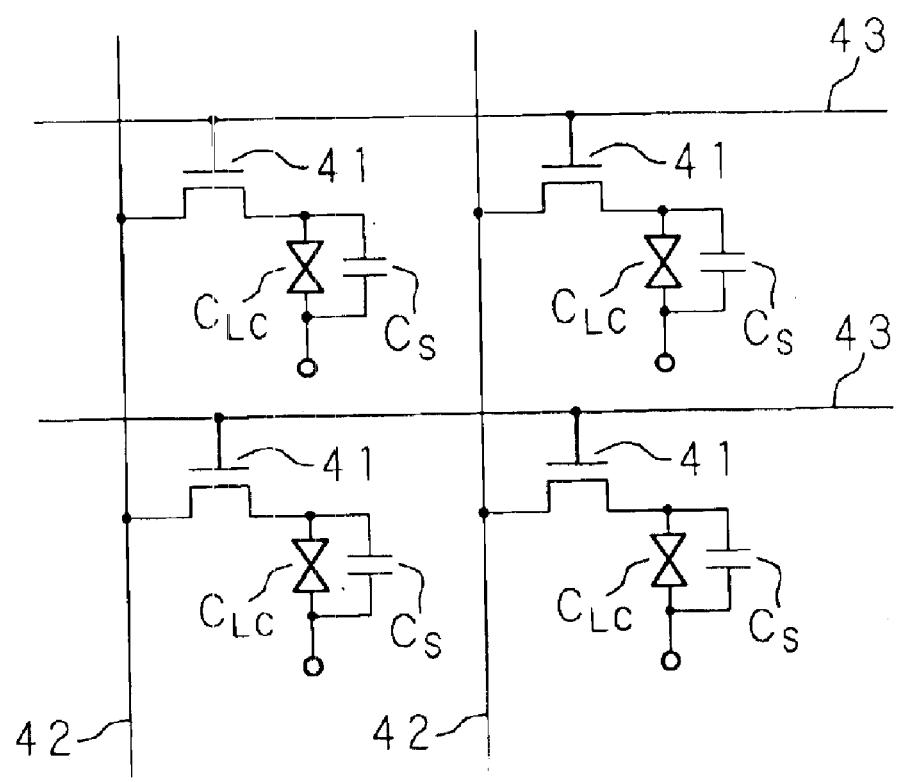
FIG. 8 is an illustration showing an example of the cell structure of the liquid crystal panel.
Figure 9:
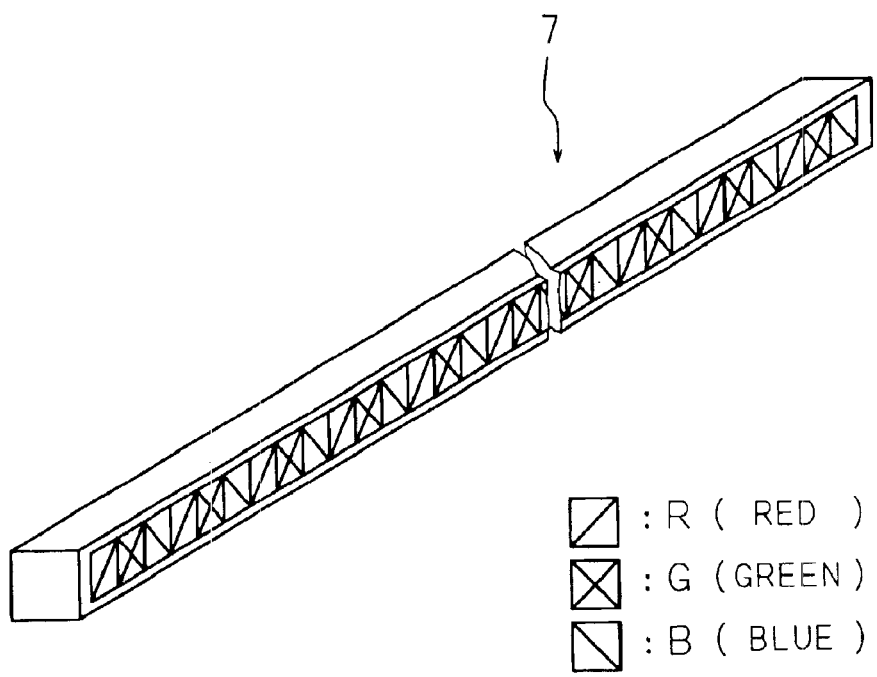
FIG. 9 is an illustration showing an example of the structure of an LED array.

FIG. 5 is a block diagram showing the circuit structure of a liquid crystal display device of the present invention; FIG. 6 is a schematic cross sectional view of a liquid crystal panel and a back-light of the liquid crystal display device; FIG. 7 is a schematic view showing an example of the overall structure of the liquid crystal display device; FIG. 8 is an illustration showing an example of the cell structure of the liquid crystal panel; and FIG. 9 is an illustration showing an example of the structure of an LED array that is a light source of the back-light.

As shown in FIG. 6 and FIG. 7, a liquid crystal panel 21 comprises a polarizer 1, a glass substrate 2, a common electrode 3, a glass substrate 4 and a polarizer 5, which are stacked in this order from the upper layer (front face) side to the lower layer (rear face) side, and pixel electrodes 40 which are arranged in matrix form on the common electrode 3 side of the glass substrate 4.

A driver unit 50 which is composed of a data driver 32, a scan driver 33, etc. as to be described later is connected between the common electrode 3 and the pixel electrodes 40. The data driver 32 is connected to TFTs 41 through signal lines 42, while the scan driver 33 is connected to the TFTs 41 through scanning lines 43. The TFTs 41 are controlled to be on/off by the scan driver 33. Each of the pixel electrodes 40 is controlled to be on/off by the TFT 41. Therefore, the intensity of transmitted light of each individual pixel is controlled by a signal given from the data driver 32 through the signal line 42 and the TFT 41. Note that, as shown in FIG. 8, in order to increase the charge amount to be injected in each pixel, it is also possible to adopt a structure (later-described third example) in which an additional storage capacity $C_S$ is connected to the TFT 41 in parallel with a liquid crystal cell $C_{LC}$.

An alignment film 12 is provided on the upper face of the pixel electrodes 40 on the glass substrate 4, while an alignment film 11 is placed on the lower face of the common electrode 3. The space between these alignment films 11 and 12 is filled with a liquid crystal material so as to form a liquid crystal layer 13. Note that the reference numeral 14 represents spacers for maintaining a layer thickness of the liquid crystal layer 13.

A back-light 22 is disposed on the lower layer (rear face) side of the liquid crystal panel 21, and comprises an LED array 7 which is placed to face an end face of a light guiding and diffusing plate 6 that forms a light emitting area. As shown in FIG. 9, this LED array 7 includes LEDs for emitting light of three primary colors, i.e., red (R), green (G) and blue (B), the LEDs being arranged sequentially and repeatedly on a surface facing the light guiding and diffusing plate 6. Then, the red, green and blue LEDs are controlled to emit light in red, green and blue sub-frames, respectively, according to a later-described field-sequential method. The light guiding and diffusing plate 6 guides the light emitted from each LED of this LED array 7 to its entire surface and diffuses it to the upper face, thereby functioning as the light emitting area.

In FIG. 5, the reference numeral 30 represents an image memory to which image data PD is inputted from an external device, for example, a personal computer, and which stores the inputted image data PD. The reference numeral 31 is a control signal generation circuit to which a synchronous signal SYN is inputted from the same personal computer, and which generates various control signals CS necessary for display. The image data PD is outputted from the image memory 30 to the data driver 32. Based on the image data PD and a control signal CS for changing the polarity of applied voltage, substantially equal voltages with different polarities are applied to the liquid crystal panel 21 through the data driver 32 during data-writing scanning and data-erasing scanning, respectively.

Moreover, the control signal generation circuit 31 outputs a control signal CS to each of a reference voltage generation circuit 34, the data driver 32, the scan driver 33, and a back-light control circuit 35. The reference voltage generation circuit 34 generates reference voltages VR1 and VR2, and outputs the generated reference voltages VR1 and VR2 to the data driver 32 and the scan driver 33, respectively. The data driver 32 outputs signals to the signal lines 42 of the pixel electrodes 40, based on the image data PD and the control signals CS. In synchronism with the output of the signals, the scan driver 33 scans the scanning lines 43 of the pixel electrodes 40 sequentially on a line by line basis. Furthermore, the back-light control circuit 35 applies a drive voltage to the back-light 22 so that each of the red, green and blue LEDs of the LED array 7 of the back-light 22 emits light in a time-divided manner.

Next, the operation of the liquid crystal display device of the present invention will be explained. To the image memory 30, image data PD of each of red, green and blue colors to be displayed by the liquid crystal panel 21 is supplied from the personal computer. After storing the image data PD temporarily, the image memory 30 outputs the image data PD upon receipt of the control signal CS outputted from the control signal generation circuit 31.

The control signal CS generated by the control signal generation circuit 31 is supplied to the data driver 32, scan driver 33, reference voltage generation circuit 34 and back-light control circuit 35. The reference voltage generation circuit 34 generates reference voltages VR1 and VR2 upon receipt of the control signal CS, and outputs the generated reference voltages VR1 and VR2 to the data driver 32 and the scan driver 33, respectively.

When the data driver 32 receives the control signal CS, it outputs a signal to the signal lines 42 of the pixel electrodes 40, based on the image data PD outputted from the image memory 30. When the scan driver 33 receives the control signal CS, it scans the scanning lines 43 of the pixel electrodes 40 sequentially on a line by line basis. According to the output of the signal from the data driver 32 and the scanning by the scan driver 33, the TFTs 41 are driven and a voltage is applied to the pixel electrodes 40, thereby controlling the intensity of the transmitted light of the pixels.

When the back-light control circuit 35 receives the control signal CS, it applies a drive voltage to the back-light 22 so that each of the red, green and blue LEDs of the LED array 7 of the back-light 22 emits light in a time-divided manner.

In this liquid crystal display device, display control is performed according to the time chart of a field-sequential method shown in FIGS. 10A, 10B and 10C. FIG. 10A shows the light-emission timing of the LED of each color of the back-light 22; FIG. 10B shows the scanning timing of each line of the liquid crystal panel 21; and FIG. 10C shows the light emission state of the liquid crystal panel 21. In this example, 60 frames are displayed in one second. Accordingly, one frame period is 1/60 second, and this one frame period is divided into three sub-frames, each having a period of 1/180 second.

Then, in each of the first through third sub-frames, as shown in FIG. 10A, the red, green and blue LEDs are controlled to emit light sequentially. By switching the pixels of the liquid crystal panel 21 on a line by line basis in synchronism with such a sequential emission of light of each color, a color image is displayed. Note that, in this example, while the red light, green light and blue light are emitted in the first sub-frame, the second sub-frame and the third sub-frame, respectively, the sequence of these colors is not necessarily limited to the order of red, green and blue, and other order may be used.

Meanwhile, as shown in FIG. 10B, with respect to the liquid crystal panel 21, data scanning is performed twice in each of the red, green and blue sub-frames. However, the timing is adjusted so that the first scanning (data-writing scanning) start timing (timing to the first line) coincides with the start timing of each sub-frame, and the second scanning (data-erasing scanning) end timing (timing to the last line) coincides with the end timing of each sub-frame.

During the data-writing scanning, a voltage corresponding to the image data PD is applied to each pixel of the liquid crystal panel 21, and the light transmittance is adjusted. Accordingly, it is possible to display a full-color image. Moreover, during the data-erasing scanning, a voltage which is the same as but has an opposite polarity to the voltage in the data-writing scanning is applied to each pixel of the liquid crystal panel 21 and the display of each pixel of the liquid crystal panel 21 is erased, thereby preventing application of a direct-current component to the liquid crystals.

The liquid crystal display device of the present invention displays a color image by the field-sequential method in the above-described manner.

FIRST EXAMPLE

A liquid crystal panel 21 of the first example as shown in FIGS. 6 and 7 was fabricated as follows. After washing a TFT substrate having pixel electrodes 40 (number of pixels: 640×480, electrode area A: $6 \times 10^{-5}$ cm, diagonal: 3.2 inches) and a glass substrate 2 having a common electrode 3, they were coated with polyamide and then baked for one hour at 200° C. so as to form about 200 Å thick polyamide films as alignment films 11 and 12.

Further, these alignment films 11 and 12 were rubbed with a rayon fabric, and an empty panel was produced by stacking the alignment films 11 and 12 with a gap being maintained therebetween by spacers 14 made of silica having an average particle size of 1.6 μm so that the rubbing directions are anti-parallel. A ferroelectric liquid crystal material based on the specifications of the present invention was sealed in between the alignment films 11 and 12 of this empty panel so as to form a liquid crystal layer 13. This liquid crystal layer 13 obtained a uniform liquid crystal alignment state and a monostable state by applying a direct current of 3 V within a range of ±3° C. from a transition point from a colesteric phase to a chiral smectic C phase.

The magnitude Ps of spontaneous polarization of the sealed ferroelectric liquid crystal material was 10 nC/cm², and the maximum value of the tilt angle when a voltage of the first polarity was applied was 35°, while the maximum value of the tilt angle when a voltage of the second polarity was applied was 7° The fabricated panel was sandwiched by two polarizers 1 and 5 arranged in a crossed-Nicol state so that the average molecular axis of the liquid crystal molecular director in the absence of an applied voltage substantially coincides with the polarization axis of one of the polarizers, and consequently the liquid crystal panel 21 was obtained.

Figure 11:
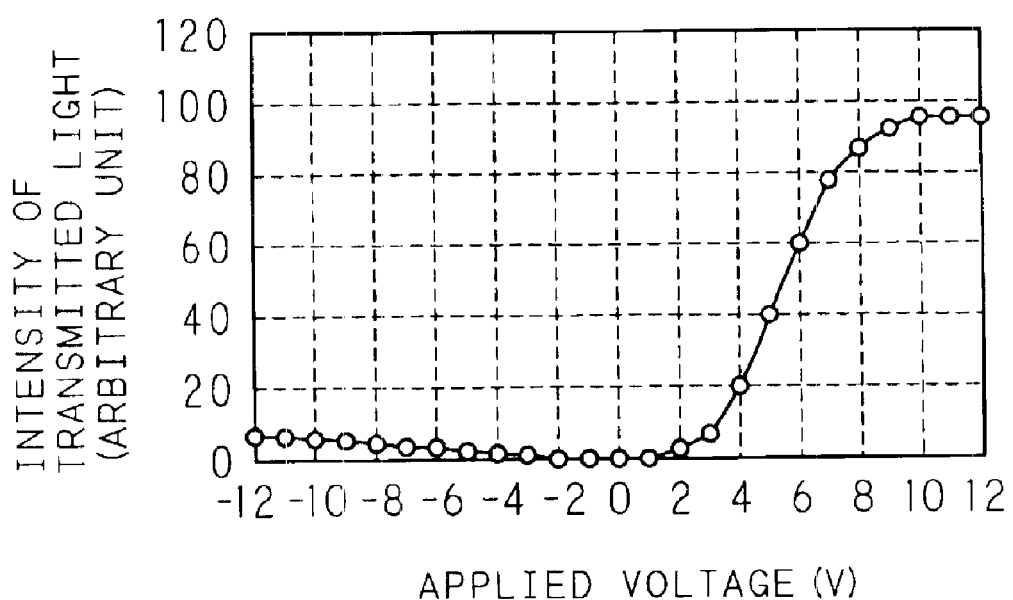
FIG. 11 is a graph showing the applied voltage-transmitted light intensity characteristic according to the first example.

The graph of FIG. 11 shows the voltage-transmitted light intensity characteristic when a voltage was applied to each pixel of the thus fabricated liquid crystal panel 21 through the switching of the TFT 41. This characteristic was measured in such a manner that a high light transmittance was obtained when the voltage of the first polarity was applied. It can be understood from the graph of FIG. 11 that a maximum value is not present in the relation between the applied voltage and the light transmittance, saturation occurs at the applied voltage of 10 V, and the maximum light transmittance is as high as about 90%.

The charge amount Q stored in each pixel through the switching of the TFT 41 when the 10V voltage was applied was estimated to be 1.80 pC. Since the magnitude Ps of the spontaneous polarization was 10 nC/cm² and the area A of the pixel electrode 40 was $60 \times 10^{-5}$ cm², 2Ps·A=1.20 pC, and thus 2Ps·A≦Q. Note that the response time for the application of 10 V was 240 μs. The light transmittance when a voltage of the second polarity was applied was about 6%, and thus exhibited a good result.

Such a liquid crystal panel 21 of the first example was combined with the above-described back-light 22, and a color image was displayed by the field-sequential method with the circuit structure shown in FIG. 5. In this case, the applied voltage to the liquid crystal was limited within a range of 0 to ±10 V As a result, it was possible to realize a high-quality bright display with excellent color purity.

SECOND EXAMPLE

A liquid crystal panel 21 of the second example as shown in FIGS. 6 and 7 was fabricated as follows. After washing a TFT substrate having pixel electrodes 40 (number of pixels: 640×480, electrode area A: $6 \times 10^{-5}$ cm, diagonal: 3.2 inches) and a glass substrate 2 having a common electrode 3, they were coated with polyamide and then baked for one hour at 200° C. so as to form about 200 Å thick polyamide films as alignment films 11 and 12.

Further, these alignment films 11 and 12 were rubbed with a rayon fabric, and an empty panel was fabricated by stacking the alignment films 11 and 12 with a gap being maintained therebetween by spacers 14 made of silica having an average particle size of 1.6 μm so that the rubbing directions are parallel. A ferroelectric liquid crystal material based on the specifications of the present invention was sealed in between the alignment films 11 and 12 of this empty panel so as to form a liquid crystal layer 13. This liquid crystal layer 13 obtained a uniform liquid crystal alignment state and a monostable state by applying a direct current of 3 V within a range of ±3° C. from a transition point from a colesteric phase to a chiral smectic C phase.

The magnitude Ps of spontaneous polarization of the sealed ferroelectric liquid crystal material was 11 nC/cm², and the maximum value of the tilt angle when a voltage of the first polarity was applied was 58°, while the maximum value of the tilt angle when a voltage of the second polarity was applied was 2°. The fabricated panel was sandwiched by two polarizers 1 and 5 arranged in a crossed-Nicol state so that a dark state was produced in the absence of applied voltage, and consequently the liquid crystal panel 21 was obtained.

Figure 12:
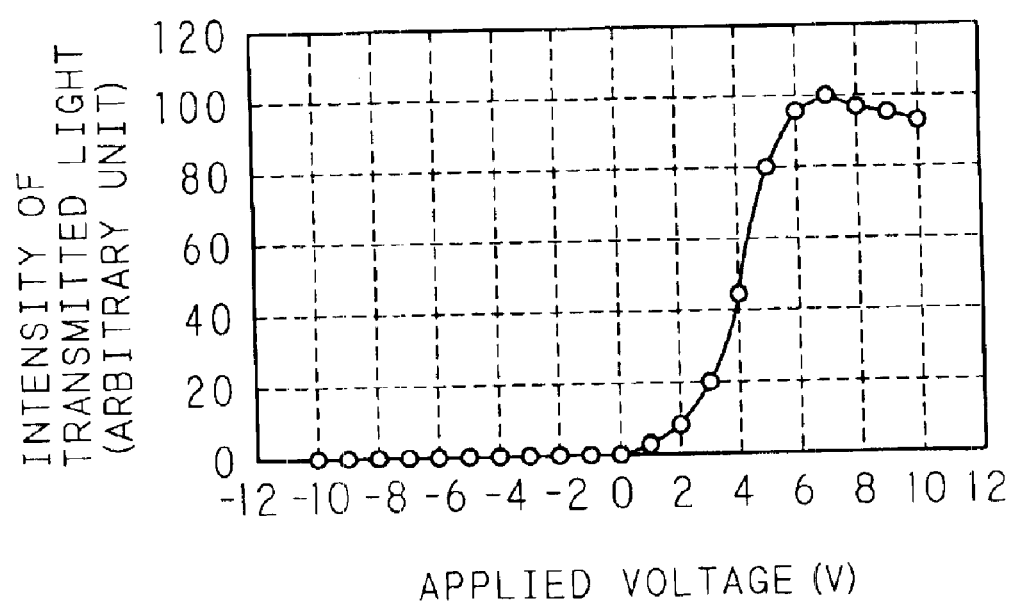
FIG. 12 is a graph showing the applied voltage-transmitted light intensity characteristic according to the second example.

The graph of FIG. 12 shows the voltage-transmitted light intensity characteristic when a voltage was applied to each pixel of the thus fabricated liquid crystal panel 21 through the switching of the TFT 41. This characteristic was measured in such a manner that a high light transmittance was obtained when the voltage of the first polarity was applied. It can be understood from the graph of FIG. 12 that a maximum value is exhibited when the applied voltage is 7 V and suitable driving is performed when the applied voltage is within a range of 0 to ±7 V.

The charge amount Q stored in each pixel through the switching of the TFT 41 when the 7V voltage was applied was estimated to be 1.26 pC. Since the magnitude Ps of the spontaneous polarization is 11 nC/cm$^2$ and the area A of the pixel electrode 40 is 60×10$^{-5}$ cm$^2$, 2Ps·A=1.32 pC, and thus 2Ps·A>Q is satisfied.

Note that the total charge amount of a current flowed by the response of the liquid crystal material during the application of 7 V was estimated to be 1.01 pC, and the response time for the application of 7 V was 230 µs. The light transmittance when the voltage of the second polarity was applied was about 1%, and thus exhibited a good result.

Such a liquid crystal panel 21 of the second example was combined with the above-described back-light 22, and a color image was displayed by the field-sequential method with the circuit structure shown in FIG. 5. In this case, the applied voltage to the liquid crystal was limited within a range of 0 to ±7 V. As a result, it was possible to realize a high-quality bright display with excellent color purity.

THIRD EXAMPLE

A liquid crystal panel 21 of the third example as shown in FIGS. 6, 7 and 8 was fabricated as follows. After washing a TFT substrate having pixel electrodes 40 (number of pixels: 640×480, electrode area A: 6×10$^{-5}$ cm, additional storage capacity: 0.2 pF, diagonal: 3.2 inches) and a glass substrate 2 having a common electrode 3, they were coated with polyamide and then baked for one hour at 200° C. so as to form about 200 Å thick polyamide films as alignment films 11 and 12.

Further, these alignment films 11 and 12 were rubbed with a rayon fabric, and an empty panel was fabricated by stacking the alignment films 11 and 12 with a gap being maintained therebetween by spacers 14 made of silica having an average particle size of 1.6 µm so that the rubbing directions are anti-parallel. A ferroelectric liquid crystal material based on the specifications of the present invention was sealed in between the alignment films 11 and 12 of this empty panel so as to form a liquid crystal layer 13. This liquid crystal layer 13 obtained a uniform liquid crystal alignment state and a monostable state by applying a direct current of 3 V within a range of ±3° C. from a transition point from a colesteric phase to a chiral smectic C phase.

The magnitude Ps of spontaneous polarization of the sealed ferroelectric liquid crystal material was 21 nC/cm$^2$, and the maximum value of the tilt angle when a voltage of the first polarity was applied was 66°, while the maximum value of the tilt angle when a voltage of the second polarity was applied was 5°. The fabricated panel was sandwiched by two polarizers 1 and 5 arranged in a crossed-Nicol state so that a dark state was produced in the absence of an applied voltage, and consequently the liquid crystal panel 21 was obtained.

Figure 13:
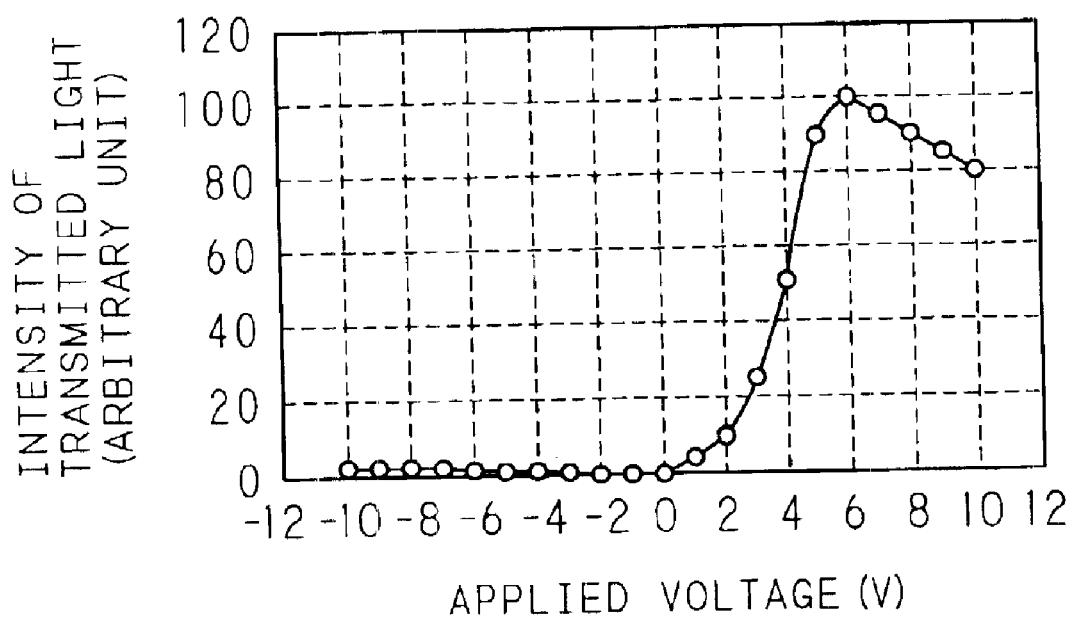
FIG. 13 is a graph showing the applied voltage-transmitted light intensity characteristic according to the third example.

The graph of FIG. 13 shows the voltage-transmitted light intensity characteristic when a voltage was applied to each pixel of the thus fabricated liquid crystal panel 21 through the switching of the TFT 41. This characteristic was measured in such a manner that a high light transmittance was obtained when the voltage of the first polarity was applied. It can be understood from the graph of FIG. 13 that a maximum value is exhibited when the applied voltage is 6 V and suitable driving is performed when the applied voltage is within a range of 0 to ±6 V.

The charge amount Q stored in each pixel through the switching of the TFT 41 when the 6V voltage was applied was estimated to be 2.28 pC including the amount of the stored capacity. Since the magnitude Ps of the spontaneous polarization is 21 nC/cm$^2$ and the area A of the pixel electrode 40 is 60×10$^{-5}$ cm$^2$, 2Ps·A=2.52 pC, and thus 2Ps·A>Q is satisfied.

Note that the total charge amount of a current flowed by the response of the liquid crystal material during the application of 6 V was estimated to be 1.71 pC, and the response time for the application of 6 V was as short as 180 µs. The light transmittance when the voltage of the second polarity was applied was about 3%, and thus exhibited a good result.

Such a liquid crystal panel 21 of the third example was combined with the above-described back-light 22, and a color image was displayed by the field-sequential method with the circuit structure shown in FIG. 5. In this case, the applied voltage to the liquid crystal was limited within a range of 0 to ±6 V. As a result, it was possible to realize a high-quality bright display with excellent color purity.

COMPARATIVE EXAMPLE 1

An empty panel was fabricated in the same manner as in the first example, and a ferroelectric liquid crystal material according to conventional specifications was sealed in between the alignment films 11 and 12 of this empty panel so as to form a liquid crystal layer 13. This liquid crystal layer 13 obtained a uniform liquid crystal alignment state and a monostable state by applying a direct current of 3 V within a range of ±3° C. from a transition point from a colesteric phase to a chiral smectic C phase.

The magnitude Ps of spontaneous polarization of the sealed ferroelectric liquid crystal material was 10 nC/cm$^2$, and the maximum value of the tilt angle when a voltage of the first polarity was applied was 31°, while the maximum value of the tilt angle when a voltage of the second polarity was applied was 11°. A liquid crystal panel 21 was obtained by sandwiching the fabricated panel by two polarizers 1 and 5 arranged in a crossed-Nicol state so that a dark state was produced in the absence of an applied voltage.

Figure 14:
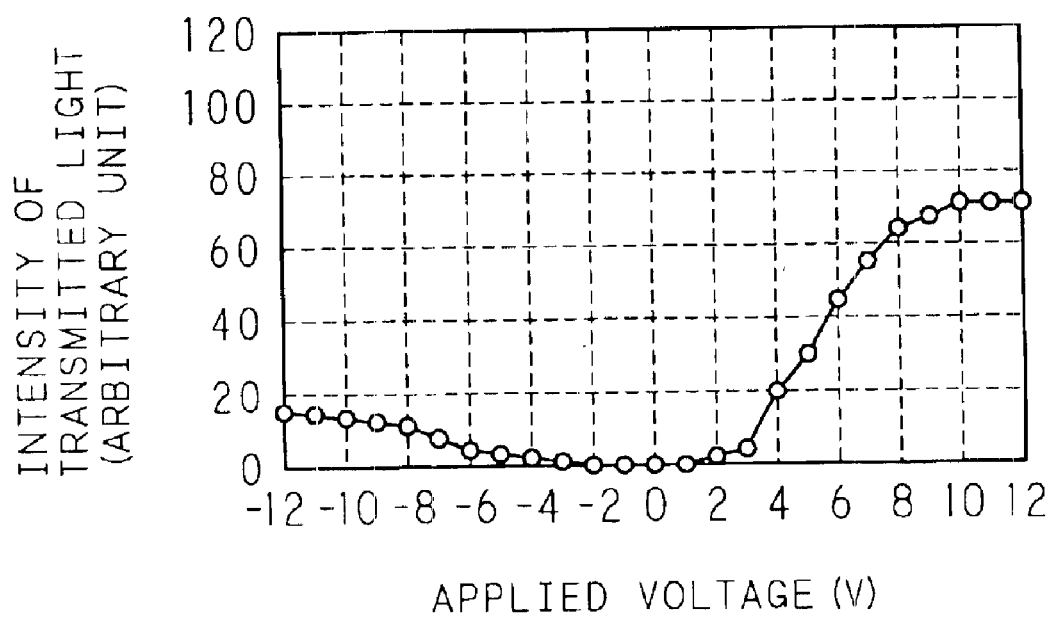
FIG. 14 is a graph showing the applied voltage-transmitted light intensity characteristic according to the first comparative embodiment.

The graph of FIG. 14 shows the voltage-transmitted light intensity characteristic when a voltage was applied to each pixel of the thus fabricated liquid crystal panel 21 through the switching of the TFT 41. This characteristic was measured in such a manner that a high light transmittance was obtained when the voltage of the first polarity was applied. It can be understood from the graph of FIG. 14 that a maximum value is not present in the relation between the applied voltage and the light transmittance, saturation occurs at the applied voltage of 10 V, and the maximum light transmittance is as low as about 75%.

The charge amount Q stored in each pixel through the switching of the TFT 41 when the 10V voltage was applied was estimated to be 1.65 pC. Since the magnitude Ps of the spontaneous polarization is 10 nC/cm$^2$ and the area A of the pixel electrode 40 is 60×10$^{-5}$ cm$^2$, 2Ps·A=1.20 pC, and thus 2Ps·A≦Q. Note that the response time for the application of 10 V was 260 µs. Further, the light transmittance when the voltage of the second polarity was applied was as high as about 15%.

COMPARATIVE EXAMPLE 2

An empty panel was fabricated in the same manner as in the second example, and a ferroelectric liquid crystal material according to conventional specifications was sealed in between the alignment films 11 and 12 of this empty panel so as to form a liquid crystal layer 13. This liquid crystal layer 13 obtained a uniform liquid crystal alignment state and a monostable state by applying a direct current of 3 V within a range of ±3° C. from a transition point from a colesteric phase to a chiral smectic C phase.

The magnitude Ps of spontaneous polarization of the sealed ferroelectric liquid crystal material was 5 nC/cm$^2$, and the maximum value of the tilt angle when a voltage of the first polarity was applied was 27°, while the maximum value of the tilt angle when a voltage of the second polarity was applied was 7°. A liquid crystal panel 21 was obtained by sandwiching the fabricated panel by two polarizers 1 and 5 arranged in a crossed-Nicol state so that a dark state was produced in the absence of an applied voltage.

Figure 15:
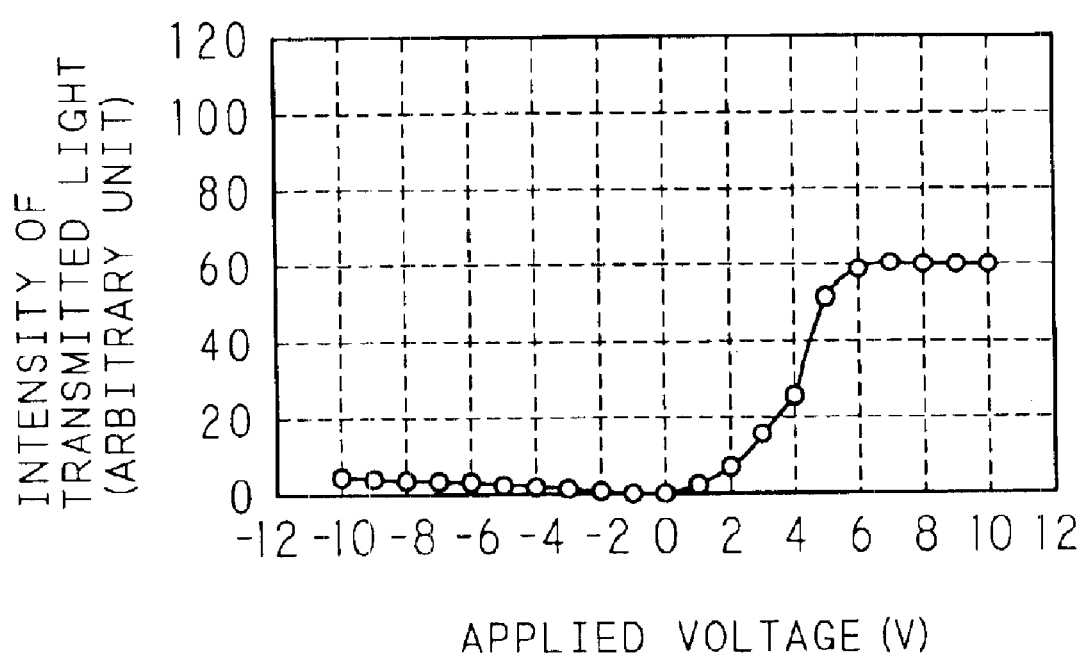
FIG. 15 is a graph showing the applied voltage-transmitted light intensity characteristic according to the second comparative embodiment.

The graph of FIG. 15 shows the voltage-transmitted light intensity characteristic when a voltage was applied to each pixel of the thus fabricated liquid crystal panel 21 through the switching of the TFT 41. This characteristic was measured in such a manner that a high light transmittance was obtained when the voltage of the first polarity was applied. It can be understood from the graph of FIG. 15 that a maximum value is not present in the relation between the applied voltage and the light transmittance, saturation occurs at the applied voltage of 7 V, and the maximum light transmittance is as low as about 60%.

The charge amount Q stored in each pixel through the switching of the TFT 41 when the 7V voltage was applied was estimated to be 1.26 pC. Since the magnitude Ps of the spontaneous polarization is 5 nC/cm$^2$ and the area A of the pixel electrode 40 is 60×10$^{-5}$ cm$^2$, 2Ps·A=0.60 pC, and thus 2Ps·A≦Q. Note that the response time for the application of 7 V was as long as 560 μs. Further, the light transmittance when the voltage of the second polarity was applied was about 60%.

In the above-described examples, although a ferroelectric liquid crystal exhibiting monostability was used as a liquid crystal material having a spontaneous polarization, it is, of course, possible to provide similar effects by using a ferroelectric liquid crystal exhibiting bistability, or an anti-ferroelectric liquid crystal.

Moreover, in the above-described examples, although a color image is displayed by a field-sequential method using individual RGB light sources, it is also possible to use a single light source capable of emitting light by switching RGB. Furthermore, the present invention can also be applied in the same manner to a structure that displays a color image by using a color filter.

As described above, according to the present invention, in the driving of a liquid crystal material having a spontaneous polarization, particularly a monostable ferroelectric liquid crystal, by a switching element such as a TFT, it is possible to achieve a high light transmittance, use a liquid crystal material having a large spontaneous polarization, and realize low-voltage driving of the liquid crystal material.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A liquid crystal display device comprising:
   two substrates facing each other;
   a liquid crystal material having a spontaneous polarization, placed between said substrates;
   electrodes for applying a voltage to said liquid crystal material; and
   a switching element connected to said electrodes,
   wherein said liquid crystal material exhibits a monostable state in which an average molecular axis of a liquid crystal molecular director is present in substantially one direction in the absence of an applied voltage,
   wherein, when a voltage of a first polarity is applied, the average molecular axis tilts from a monostable position to one side at an angle corresponding to a magnitude of the applied voltage,
   wherein, when a voltage of a second polarity having an opposite characteristic to the first polarity is applied, the average molecular axis maintains the monostable position or tilts from the monostable position to a side opposite to said one side corresponding to the application of the voltage of the first polarity, and
   wherein, when a tilt angle in the application of the voltage of the first polarity is larger than a tilt angle in the application of the voltage of the second polarity, a maximum tilt angle in the application of the voltage of the first polarity is not less than 45°.

2. The liquid crystal display device of claim 1,
   wherein a maximum tilt angle in the application of the voltage of the second polarity is not more than 10°.

3. The liquid crystal display device of claim 1,
   wherein the maximum tilt angle in the application of the voltage of the first polarity during actual driving is not more than 45°.

4. The liquid crystal display device of claim 1, further comprising:
   an additional storage capacity provided on the liquid crystal material driving electrode side of said switching element.

5. The liquid crystal display device of claim 1,
   wherein said liquid crystal material is driven within an applied voltage range of 0 to ±V, where V is an applied voltage to said liquid crystal material at which a light transmittance of said liquid crystal material becomes a maximum.

6. The liquid crystal display device of claim 1, further comprising:
   a back-light having a light source to emitting light of three primary colors,
   wherein a color image is displayed by time-division switching of colors of light emitted by said light source in synchronism with on-off driving of said switching elements.

7. A liquid crystal display device, comprising:
   two substrates facing each other;
   a liquid crystal material having a spontaneous polarization, placed between said substrates;
   electrodes for applying a voltage to said liquid crystal material; and
   a switching element connected to said electrodes,
   wherein said liquid crystal material exhibits a monostable state in which an average molecular axis of a liquid crystal molecular director is present in substantially one direction in the absence of an applied voltage,
   wherein, when a voltage of a first polarity is applied, the average molecular axis tilts from a monostable position to one side at an angle corresponding to a magnitude of the applied voltage,
   wherein, when a voltage of a second polarity having an opposite characteristic to the first polarity is applied, the average molecular axis maintains the monostable position or tilts from the monostable position to a side opposite to said one side corresponding to the application of the voltage of the first polarity, wherein, when a tilt angle in the application of the voltage of the first polarity is larger than a tilt angle in the application of the voltage of the second polarity, a maximum tilt angle in the application of the voltage of the first polarity is not less than 35°, and wherein a relation $2Ps \cdot A > Q$ is satisfied, where Q is a maximum charge amount stored in each pixel by switching of said switching element, A is the area of said electrodes, and Ps is a magnitude of said spontaneous polarization per unit area.

8. A liquid crystal display device, comprising:

two substrates facing each other;

a liquid crystal material having a spontaneous polarization, placed between said substrates;

electrodes for applying a voltage to said liquid crystal material; and a switching element connected to said electrodes, wherein said liquid crystal material exhibits a monostable state in which an average molecular axis of a liquid crystal molecular director is present in substantially one direction in the absence of an applied voltage, wherein, when a voltage of a first polarity is applied, the average molecular axis tilts from a monostable position to one side at an angle corresponding to a magnitude of the applied voltage, wherein, when a voltage of a second polarity having an opposite characteristic to the first polarity is applied, the average molecular axis maintains the monostable position or tilts from the monostable position to a side opposite to said one side corresponding to the application of the voltage of the first polarity, wherein, when a tilt angle in the application of the voltage of the first polarity is larger than a tilt angle in the application of the voltage of the second polarity, a maximum tilt angle in the application of the voltage of the first polarity is not less than 35°, and wherein a maximum charge amount stored in each pixel by switching of said switching element is smaller than a total charge amount of a switching current per pixel resulting from a complete reversal of the spontaneous polarization of said liquid crystal material.

9. A liquid crystal display device, comprising:

two substrates facing each other;

a liquid crystal material having a spontaneous polarization, placed between said substrates;

electrodes for applying a voltage to said liquid crystal material; and a switching element connected to said electrodes, wherein said liquid crystal material exhibits a monostable state in which an average molecular axis of a liquid crystal molecular director is present in substantially one direction in the absence of an applied voltage, wherein, when a voltage of a first polarity is applied, the average molecular axis tilts from a monostable position to one side at an angle corresponding to a magnitude of the applied voltage, wherein, when a voltage of a second polarity having an opposite characteristic to the first polarity is applied, the average molecular axis maintains the monostable position or tilts from the monostable position to a side opposite to said one side corresponding to the application of the voltage of the first polarity, wherein, when a tilt angle in the application of the voltage of the first polarity is larger than a tilt angle in the application of the voltage of the second polarity, a maximum tilt angle in the application of the voltage of the first polarity is not less than 35°, and wherein, when charge amount injected in each pixel when the applied voltage is $+V$ or $-V$ is denoted by q, a charge amount of a current flowed by a response of said liquid crystal material due to the applied voltage of $+V$ or $-V$ is not more than q.

* * * * *

UNITED STATES PATENT AND TRADEMARK OFFICE
CERTIFICATE OF CORRECTION

PATENT NO. : 6,888,610 B2
DATED : May 3, 2005
INVENTOR(S) : Toshiaki Yoshihara et al.

It is certified that error appears in the above-identified patent and that said Letters Patent is hereby corrected as shown below:

Title page,
Item [57], ABSTRACT,
Line 17, delete "450°" and insert -- 45° --.

Signed and Sealed this

Twenty-seventh Day of December, 2005

JON W. DUDAS
*Director of the United States Patent and Trademark Office*